(12) United States Patent  (10) Patent No.: US 9,075,482 B2
Ilmonen  (45) Date of Patent: Jul. 7, 2015

(54) OPTICAL TOUCH DISPLAY

(75) Inventor: Tommi Ilmonen, Espoo (FI)

(73) Assignee: Multitouch Oy, Helsinki (FI)

( * ) Notice: Subject to any disclaimer, the term of this patent is extended or adjusted under 35 U.S.C. 154(b) by 0 days.

(21) Appl. No.: 13/997,880

(22) PCT Filed: Dec. 31, 2010

(86) PCT No.: PCT/FI2010/051102
§ 371 (c)(1),
(2), (4) Date: Jun. 25, 2013

(87) PCT Pub. No.: WO2012/089894
PCT Pub. Date: Jul. 5, 2012

(65) Prior Publication Data
US 2013/0285987 A1    Oct. 31, 2013

(51) Int. Cl.
*G06F 3/042* (2006.01)
(52) U.S. Cl.
CPC .................................... *G06F 3/0425* (2013.01)
(58) Field of Classification Search
CPC .. G06F 3/0421; G06F 3/04886; G06F 3/0425
USPC .................................................. 345/173–175
See application file for complete search history.

(56) References Cited

U.S. PATENT DOCUMENTS

| 2001/0020933 | A1* | 9/2001 | Maggioni | 345/156 |
| 2004/0095333 | A1* | 5/2004 | Morag et al. | 345/173 |
| 2006/0132454 | A1* | 6/2006 | Chen et al. | 345/173 |
| 2007/0046625 | A1* | 3/2007 | Yee | 345/156 |
| 2008/0088593 | A1 | 4/2008 | Smoot | |
| 2009/0128499 | A1 | 5/2009 | Izadi et al. | |
| 2010/0283763 | A1 | 11/2010 | Kim et al. | |
| 2011/0012866 | A1* | 1/2011 | Keam | 345/175 |

FOREIGN PATENT DOCUMENTS

WO    WO 2008/091471 A1    7/2008

OTHER PUBLICATIONS

ThinSight: Versatile Multi-touch Sensing for Thin Form-factor Displays by Steve Hodges, Shahram Izadi, Alex Butler, Alban Rrustemi and Bill Buxton, Dated Jan. 8, 2007, downloaded from http://www.billbuxton.com/UISTthinSight.pdf.

* cited by examiner

*Primary Examiner* — Charles V Hicks
*Assistant Examiner* — Charles Zheng
(74) *Attorney, Agent, or Firm* — Shalom Wertsberger; Saltamar Innovations

(57) ABSTRACT

An interactive display device (100) has an image layer (102) for presenting user perceivable visual content and a touching surface (101) covering the image layer (102) or formed by the image layer (102). Further, there are a plurality of invisible light sources (110) for illuminating alternatingly different sub-regions of the touching surface (101) and a plurality of touch detection units (107) for capturing images of illuminated sub-regions from behind the image layer (102). From the captured images contact areas are detected where a pointing object (112) contacts the touching surface (101) and thus causes correspondingly one or more marks in the captured images. The remaining ones of the invisible light sources (110) are controlled to be operable while adjacent touch detection units and associated invisible light sources are controlled to be non-operable so as to reduce undesired reflections of invisible light from non-contacting objects in the vicinity of the touching surface.

20 Claims, 3 Drawing Sheets

OPTICAL TOUCH DISPLAY

FIELD OF THE INVENTION

The present invention generally relates to an interactive display.

BACKGROUND OF THE INVENTION

There are interactive displays which comprise e.g. a projector or a Liquid Crystal Display (LCD) panel to form an image on a surface, a camera or other optical detector behind the surface, and a computer vision circuitry for detecting user input.

There are numerous different technologies for optical multi-touch detection. Many of these are described in the publication "ThinSight: Versatile Multi-touch Sensing for Thin Form-factor Displays" by Steve Hodges, Shahram Izadi, Alex Butler, Alban Rrustemi and Bill Buxton, see http://www.billbuxton.com/UISTthinSight.pdf. Optical touch detection is advantageous for a variety of reasons including ability to detect multiple touch points or areas on the display. However, the optical recognition of touching is exposed to illumination related changes in the environment. Typically, infrared (IR) light is used to illuminate the touch screen and the reflecting or shadowing of the IR light is measured. The operation of such touch screens depends, for example, on the frequency and amplitude distribution of ambient light, direction of ambient light, and reflectance and size of user's fingers.

It is an object of the present invention to avoid problems associated with prior art and/or to provide an alternative to existing technology.

SUMMARY

According to a first aspect of the invention there is provided an interactive display device comprising:
   an image layer configured to provide a user with user perceivable visual content;
   a touching surface covering the image layer or formed by the image layer; characterized by:
   a plurality of invisible light sources configured to illuminate alternatingly different sub-regions of the touching surface;
   a plurality of touch detection units configured to capture images of illuminated sub-regions;
   a first processor configured to detect from the captured images contact areas where a pointing object contacts the touching surface and thus causes correspondingly one or more marks in the captured images; and
   a second processor configured to control at least one of the invisible light sources to be operable while remaining ones of the invisible light sources are controlled to be non-operable so as to reduce undesired reflections of invisible light from non-contacting objects in the vicinity of the touching surface.

Advantageously, undesired reflections from non-contacting objects may be reduced by controlling some invisible light sources to be inoperable. Such reduction of reflections may help the detection of the areas where the pointing object contacts the touching surface.

A common processor may operate as both the first and second processors. Alternatively, one or both of the first and second processors may comprise two or more different processors.

The second processor may be a relatively simple control processor with few or no other tasks in addition to controlling into operable or non-operable state the invisible light sources.

The touch detection units may be configured to operate with the invisible light provided by the associated invisible light source. The invisible light may be infrared light.

The touch detection units and associated invisible light sources may be arranged into groups so that at least some adjacent touch detection units and associated invisible light sources are distributed in different ones of the groups.

The touch detection units may be configured to capture the images from behind the image layer The touch detection units may be arranged in a grid.

The touch detection units may comprise camera units. The camera units may be rolling shutter camera units, such as commonly available complementary metal oxide-semiconductor (CMOS) camera units. The rolling shutter camera units may be synchronized in such a way that the rolling shutter operation extends from one rolling shutter camera unit to another.

The image layer may be configured to pass through light with the invisible frequency range.

Each of the marks may appear as a shadow or highlight.

The image capture unit may be configured to obtain the captured images through the image layer. Alternatively, the image capture unit may be formed on the image layer or in front of the image layer such that the images produced by the image layer are visible to the user through the image capture unit.

According to a second aspect of the invention there is provided a method in an interactive display device, comprising:
   providing a user with user perceivable visual content on an image layer, wherein there is a touching surface covering the image layer or formed by the image layer;
characterized by:
   illuminating alternatingly different sub-regions of the touching surface with a plurality of invisible light sources;
   capturing images of illuminated sub-regions with touch detection units, wherein each of the invisible light sources is associated with one or more touch detection units;
   detecting from the captured images contact areas where a pointing object contacts the touching surface and thus causes correspondingly one or more marks in the captured images; and
   controlling at least one of the invisible light sources to be operable while controlling remaining ones of the invisible light sources to be non-operable so as to reduce undesired reflections of invisible light from non-contacting objects in the vicinity of the touching surface.

The method may further comprise taking rolling shutter images of the sub-regions and advancing capturing of images from one sub-region to another such that the rolling shutter operation extends from one sub-region and associated touch detection unit to adjacent sub-region and associated touch detection unit.

According to a third aspect of the invention there is provided a computer program configured to cause when executed by a computer a method according to the second aspect of the invention.

According to a fourth aspect of the invention there is provided a computer readable memory medium embodied with a computer program which when executed by a computer causes a computer to perform a method according to the second aspect of the invention.

According to a fifth aspect of the invention there is provided a computer program product comprising a non-transitory computer readable medium having computer executable program code stored thereon, which when executed by at least one processor causes an apparatus at least to perform a method according to the second aspect of the invention.

Various embodiments of the present invention have been illustrated only with reference to certain aspects of the invention. It should be appreciated that corresponding embodiments may apply to other aspects and embodiments as well to produce further non-limiting examples.

BRIEF DESCRIPTION OF THE DRAWINGS

The invention will be described, by way of example only, with reference to the accompanying drawings, in which:

FIG. 4 shows a system to illustrate further details regarding possible circuitries suited e.g. for implementing the sub-regions shown in FIG. 3a.

DETAILED DESCRIPTION

In the following description, like numbers denote like elements.

In the following examples of various embodiments of the invention an LCD screen is used as an example of an image layer. The LCD screen may comprise a film that forms a visible image and optionally also other elements such as background illumination, infrared (IR) illumination, incoming IR intensity detection across the screen, and/or one or more speakers for outputting sound. It is appreciated that the invention may likewise be applied with any other types of image layers as well, or screens for simpler expression. Generally, an image layer is any means for producing a visible image for a user, such as an electric display, a screen displaying a projected image or a substance carrying printed, dyed image, or woven image. However, the image layer should be sufficiently transparent or translucent for IR light that is used for detecting a pointing object through the image layer as will be explained in more detail in the following.

Figure 1:
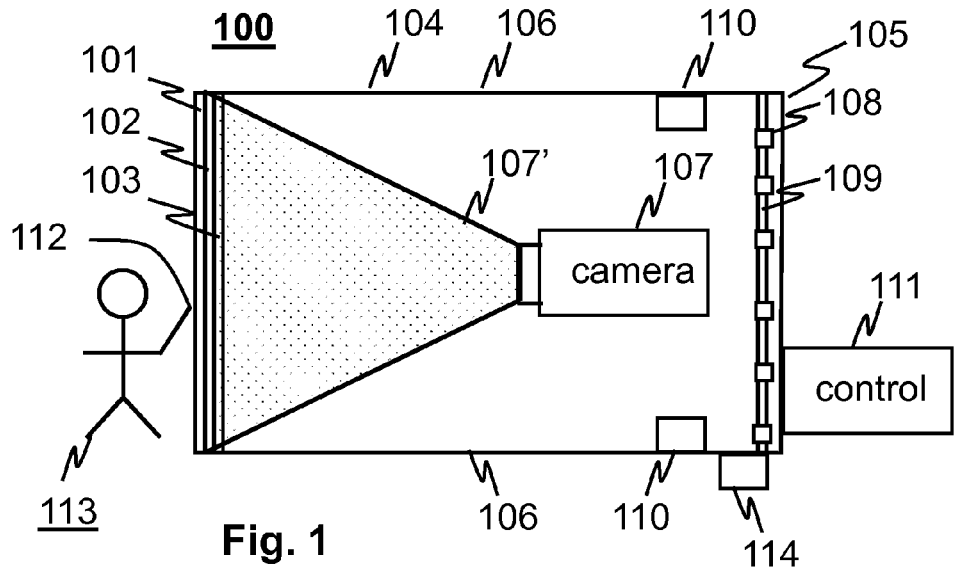
FIG. 1 shows a block diagram of a system according to an embodiment of the invention.

FIG. 1 shows a block diagram of a system 100 according to an embodiment of the invention. FIG. 1 also shows a user 113 for facilitating the description of particular order of different elements. The system 100 is suited for use as an interactive user interface device e.g. as a built in dynamic menu in a restaurant, as a display screen at a ticket office, or generally wherever an interactive display and optical pointing recognition is desired.

The system 100 comprises as an outmost element or as facing to the user 113 a touching surface 101 such as a toughened glass plate, then an LCD film 102 as a display screen and a diffusion layer 103 behind the screen. Preferably, the touching surface, the screen 102 and the diffusion layer 103 are all in a compact stack such that the distance from the touching surface to the diffusion layer is as low as possible for machine view performance reasons that will be described in more detail in this description.

The purpose of the diffusion layer 103 is to spread the light coming from a background light source (described in the following), so that an image displayed on the screen appears even from many directions. This spreading can be achieved with a diffusion film or with a holographic rear-projection film. By placing the diffusion layer 103 behind the screen 102, significant advantages may be achieved in comparison to placing the diffusion layer 103 in front of the screen 102 or to omitting the diffusion layer 103. Namely, the diffusion layer 103 reducing reflections from the typically glossy backside of the screen 102, which reflections may interfere with the recognizing of pointing objects. It is also advantageous to locate the diffusion layer 103 behind the screen 102 when seen by a user 113, because otherwise it provides an additional reflecting surface between the screen 102 and the viewer thus impairing the image quality or contrast especially.

In order to support the aforementioned optical elements, there is provided a casing 104. The casing 104 comprises a back wall 105 attached to side walls 106. The side walls are attached from one end to the back wall 105 and from their opposite ends to the touching surface 101, screen 102 and diffusion layer 103. A background light source 108 may be located in the casing 104 for background illumination of the screen 102. The background light source 108 may comprise, for example, one or more of: LED light, light conductor, fluorescent light, and luminescence light.

In an alternative embodiment, the diffusion layer 103 is omitted. This may particularly be the case when an evenly illuminating background light is provided by a luminescence light that in itself provides an even field of illumination on the LCD film 102.

The side walls 106 may be coated from the inner side with some reflective material in order to deliver maximum amount of light to the screen and finally to users of the system. By means of the reflective side walls one may avoid or at least reduce shadows that may be caused to the background light in the IR image captured by a camera behind the screen 102. The reflective side walls may also help in delivering the background light to the screen in a way that the light can be spread to the users without allowing users to see details inside the system through the screen and at the same time improving the viewing angle of the system. In addition to the reflective side walls (or reflective casing) the diffusion layer 103 may help to achieve this effect. More particularly, the side walls may be for example mirror walls, in which case a particularly good consistency of an image on the image layer may be achieved.

Inside the casing, there is an image capture unit 107 that is in this particular case an IR camera configured to see through the diffusion layer 103, screen 102 and the touching surface 101 any objects placed near or at the touching surface 101. Further in FIG. 1, there is drawn as a dotted area an IR light reception space 107' for the IR camera. The camera is configured to detect signals that are outside the visible light wavelengths. There may be for example a filter in front of the lens of the camera providing this effect. The camera may be based on for example CCD (charge-coupled device) or CMOS (complementary metal-oxide-semiconductor) technology. Moreover, the image capture unit 107 may comprise more than one camera e.g. for better resolution, for smaller distance between the screen and the cameras, or for covering larger LCD screens 102.

The distance between the background light source 108 and the diffusion layer 103 may generally depend on the space that the camera setup requires. The distance may be shortened for more compact sized system e.g. by moving the camera forward and/or turning the camera around (to point away from the screen) and using a mirror or prism in front of the camera to capture the activities on the screen.

Alternatively, the image capture unit 107 may be formed of a planar sensing structure that has a number of sensors spread over a plane to recognize intensity of incoming light through each pixel or pixel block of the screen 102. Such a structure may also double as a visible light and/or IR illumination behind the screen 102 for the purpose of background illuminating the LCD screen and/or illuminating objects in front of the LCD screen under weak ambient IR illumination. In case of a planar sensing structure operating as an image capture unit 107, there is no IR light reception space 107' as that drawn in FIG. 1 but instead there is merely a small parallel space between the screen and the image capture unit. Further, the image capture unit may be integrated directly into the image plane, for example the screen.

The camera 107 and the IR LEDs 110 may not be seen from the outside of the system if their shadow is negligent e.g. due to the highly diffused illumination coming from the background lights and as the reflective inner side of the system provides evens further illumination of the display surface. Further, the diffusion layer 103 may prevent the users from seeing any details from inside the system.

A camera as the IR image capture unit typically provides a more economical solution than a plurality of emitter/detector pairs that are typically used in a planar illumination and sensing element. First, the area covered by one camera typically requires a relatively high number of emitter/detector pairs thus incurring a relatively high number of components and wires. Second, production of the system may be simpler when a camera is used. On the other hand, by using emitter/detector pairs in a planar image capture unit, the size of the system may be reduced and there is no need for accurately positioning and directing the camera in a desired angle with regard to the screen 102.

The system 100 may further comprise an IR reflection inhibitor 109 configured to reduce reflection of IR light from the back wall and again from any elements in front of the camera 107. The IR reflection inhibitor 109 may comprise, for instance, a black plate such as a sooted aluminum plate placed around the background light source 108 or behind the background light source 108. Alternatively, the IR reflection inhibitor 109 may comprise additionally or alternatively a selective screen between the background light source 108 and the IR light reception space 107'.

Additionally the system 100 comprises invisible light sources 110 such as IR light sources for facilitating input detection on IR wavelengths. The invisible light sources may comprise for example IR LEDs placed outside the angle of view of the image capture unit. In case that a camera is used as the image capture unit, the invisible light sources 110 may be located outside a cone formed by the view area of the camera. On the other hand, if a planar image capture unit behind or integrated with the LCD screen is used, the LCD screen itself may be configured to provide the IR illumination across its view area or the IR illumination may be configured to be produced such that it illuminates objects at the LCD screen without first passing through the LCD screen.

The system 100 may further comprise an audio speaker 114 for providing audible signals to the user 113. The system may be configured to e.g. provide a tapping sound to indicate determined tapping on the touching surface 101 for enhancing user experience of an operable system and to teach users that there is no need for applying substantial force against the touching surface when the recognition of the pointing object 112 is optically performed.

While FIG. 1 only shows a single camera, some embodiments of this invention are easier to understand when assuming that there is a matrix of cameras 107 and invisible light sources 110. For instance, there may be 8 columns×4 rows of cameras 107 and invisible light sources each covering a different sub-region of the touching surface 101. The different sub-regions may have overlap or the different sub-regions may be non-overlapped.

Figure 2:
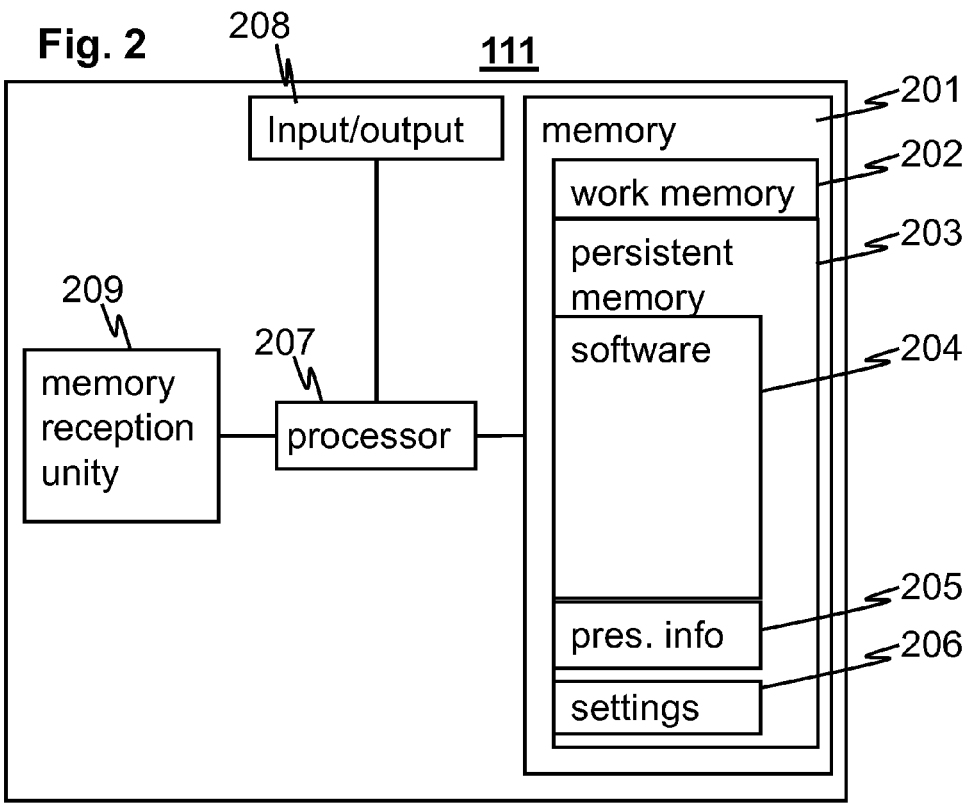
FIG. 2 shows a simplified block diagram of the structure of a control unit shown in FIG. 1 according to an embodiment of the invention.

FIG. 2 shows a simplified block diagram of the structure of the control unit 111. The control unit 111 may be based on, for example, a general purpose computer supplied with suitable software and/or on a particularly adapted computing device. While it is possible to implement the control unit 111 by purely hardware based a device, typically it is more economic and faster to produce by making use of software.

In FIG. 2, the control unit 111 is drawn to comprise a memory 201 that comprises a work memory 202, a non-volatile memory 203 that is configured to store software 204, presentation information 205 describing content to be presented by the system 100 and/or how pointing at different areas on the screen should be treated, and settings 206 needed e.g. for manual or automatic calibration of the system 100. The software 204 may comprise any one or more of the following items: operating system, device drivers, display presentation application, hypertext markup language parser, image processing software, and drivers for different external equipment that may be connected to the system such as printers, further displays, further interactive systems 100, audio systems, and external IR illumination equipment (not shown).

The control unit 111 further comprises a processor 207 configured to control the operation of the control unit 111 according to the software 204 by executing computer executable program code contained by the software in the work memory 202. Alternatively, the control unit may be configured to execute the software in place in the non-volatile memory in which case the work memory may not be necessary. The control unit further comprises an input/output unit (I/O) 208 for exchanging signals with other elements of the system 100 and optionally also with external equipment. The I/O 208 may comprise e.g. any one or more of a universal serial bus port, a local area network port, an ISA bus, a PCI express port, an IR port, a Bluetooth element, and a parallel port. Alternatively to being configured capable of communicating with external equipment, the system 100 may be provided with a transferable memory reception unit 209 such as a cd-rom or dvd-rom drive, memory card reader or memory stick reader which enables replacing part of the non-volatile memory e.g. for updating information to be displayed on the LCD screen 102.

In order to control the operation of various components of the system and to obtain the captured image, there are connections between the control unit or particularly its input/output unit 208 and other components of the system 100, while not shown in sake of clarity of the drawing. The control unit has generally the task of receiving a signal from the camera 107, detecting if and where the touching surface 101 is pointed at and typically also outputting the determination in a standard way e.g. emulating a computer drawing tablet, mouse or other known pointing device.

Generally, the control unit operation may comprise following acts:

controlling the screen to show desired images to the user 113;

controlling the IR lights 110 to produce IR light on demand for showing a pointing object 112 such as a user's 113 finger when brought close to the screen;

obtaining signals corresponding to received IR light from the image capture unit 107;

detecting from the received signals the pointing object at the touching surface 101;

performing a predefined action based on the detected input, e.g. changing the image displayed on the screen 102 or following a hyperlink associated with the area at which the pointing object is detected; and/or detecting the amount of ambient IR light controlling the IR lights 110 accordingly.

It is appreciated that while the control unit may consist of one separate unit, the control unit 111 may alternatively be integrated with any other element or comprise two or more discreet elements each for one or more of the aforementioned acts.

Figures 3A, 3B:
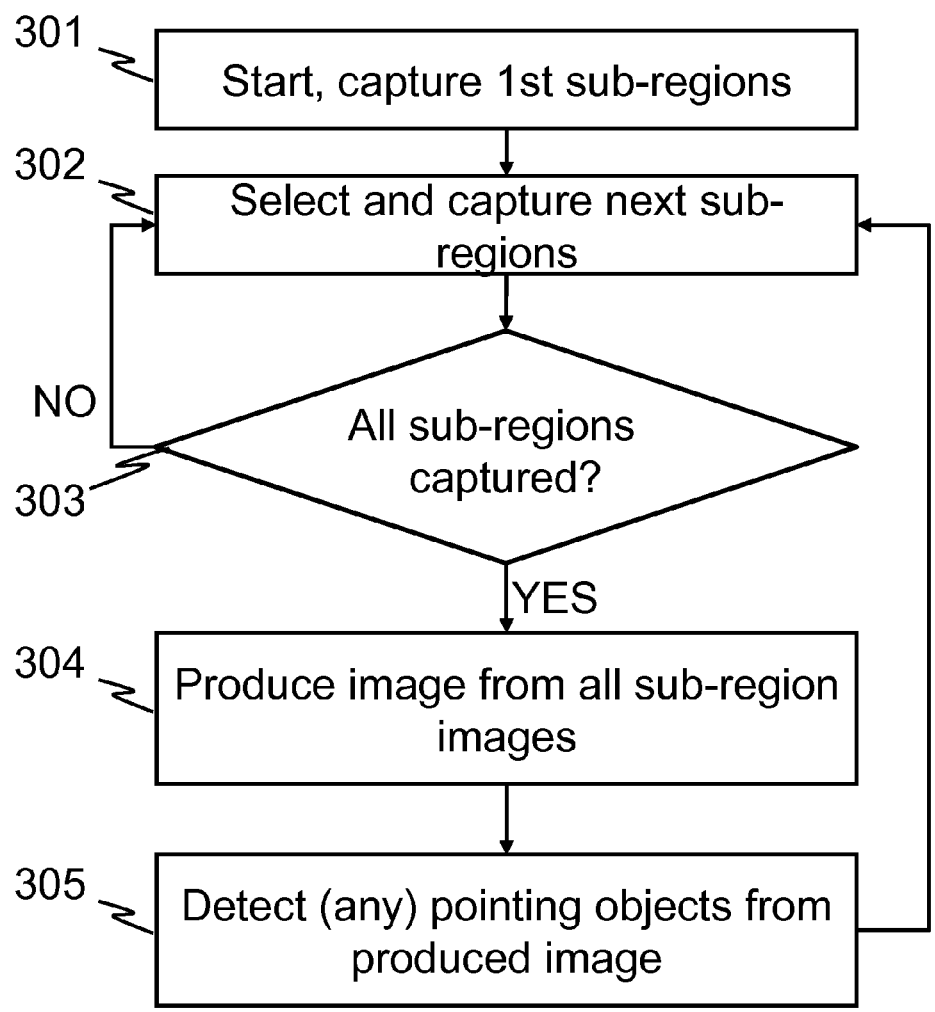
FIG. 3a shows an example of distribution of a touching surface into a plurality of sub-regions.
FIG. 3b shows a schematic flow chart according to an embodiment of the invention for illustrating a first phase in a process of determining a pointing object from an Infrared (IR) image captured by an IR image capture unit from behind of the pointing object under clear daylight or strong and relatively coherent ambient IR light.

FIG. 3a shows an example of distribution of a touching surface 101 into a plurality of sub-regions. The sub-regions are drawn to form an 8×4 matrix and denoted with reference signs 1-1 to 4-8. The sub-regions may correspond to different compartments formed into an interactive display device (e.g. with separating walls) or the sub-regions may simply represent different parts of the touching surface as seen by different image capture units 107. In some other embodiments, some of the borders between different sub-regions have compartmentalizing walls while some other sub-regions are not compartmentalized. In the absence of walls that separate different sub-regions, it is understood by the inventor that the invisible light sources 110 configured to illuminate a given sub-region may also to some extent illuminate neighboring sub-regions. This may be particularly the case when the user's body is near the touching surface and the user wears light clothing that reflects a substantial portion of the invisible light transmitted by the invisible light sources 110. In result, neighboring sub-regions may severely interfere touch detection at each other.

Figure 4:
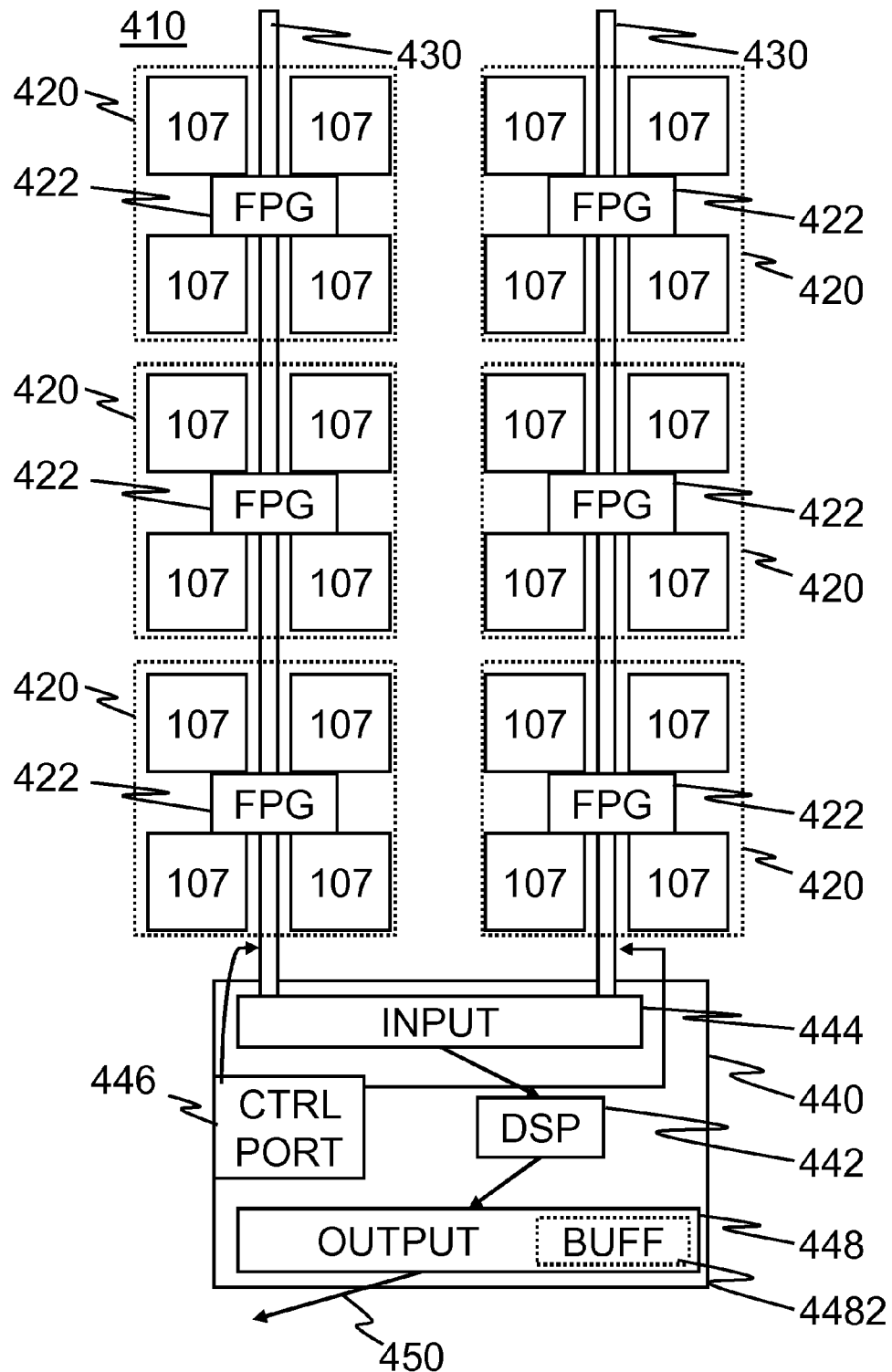

FIG. 4 shows some further details regarding possible circuitries suited for e.g. implementing the sub-regions shown in FIG. 3a. However, a process description is first presented with reference to FIG. 3b.

FIG. 3b shows a schematic flow chart according to an embodiment of the invention for illustrating a process of determining a pointing object from an IR image captured by an IR image capture unit 107 or more precisely by a plurality of image capture units 107. Let us consider that the image capture units 107 are rolling shutter cameras such as CMOS cameras. In other words, the image is formed on a row-by-row basis. This operation has some adverse effects especially for taking photographs of moving objects, but here new advantages may be obtained. Let us consider that the image capture units 107 are operated in a sequence so that once an image capture unit 107 in the top row completes taking one image of one sub-region, the image capture unit right beneath will commence taking the next image of another sub-region. For instance, each image capture unit may be configured to operate row by row and then advancing next column. In the following, there is described an example process in which two different image capture units 107 are being used simultaneously for illustrating parallel operation with spatial neighbor interference reduction.

In step 301, the process for detecting pointing objects 112 starts and the invisible light source and camera units are activated for first (normally non-adjacent) sub-regions, say for sub-regions 1-1 and 3-5. These sub-regions are illuminated and image captured for subsequent processing preferably when all the sub-regions have been processed.

Next in step 302, the following sub-regions are selected and processed as the first sub-regions in step 301 along the processing order of the sub-regions. It is understood more (or less) than two sub-regions may be processed simultaneously. Moreover, the sub-regions need not be processed exactly simultaneously; the exact timing of parallel processing of different sub-regions may be partly random or there may be a given time offset such as half the image capturing period, for instance (e.g. $\frac{1}{60}$ sec/2=$\frac{1}{120}$ s). Using FIG. 3 as a reference, the sub-regions may be thus scanned through each vertical column and then to next column and then jumping back to first column after the last column. Of course, in some other embodiments the scanning may proceed along rows rather than columns. In a preferred embodiment, if rolling shutter cameras are used, the scan order is yet such that the operation may be advanced from one sub-region and its camera to the following accounting for the direction of the rolling shutter so that smooth advancing may be achieved. Therefore, there should be no holes or other discontinuities in images formed by combining plural adjacent sub-images unlike with current systems where rolling shutter images may suffer from temporal disruptions.

It is then checked 303 if all the sub-regions have been captured already. If not, the process resumes to step 302, otherwise the process advances to step 304.

In step 304, an image is formed for the entire touching surface 101 based on all the different sub-regions. This step 304 may be carried out after processing of all the sub-regions as drawn in FIG. 3b. Alternatively, the step 303 may be carried out when a predetermined number of sub-regions have been processed or when a predetermined threshold is met.

By processing in temporally parallel manner two or more sub-regions, higher number of cameras may be accounted for and/or other enhancements may be applied such as taking different images of each sub-region with varied invisible illumination intensity. However, for avoiding of reflections from the user, typically best results are achieved by illuminating and imaging the sub-regions one by one.

The pointing object(s) 112 may be detected using any of the known techniques. For instance, the methods disclosed in the co-pending patent applications PCT/FI2010/050082 and PCT/FI2008/050475 may be employed.

FIG. 4 shows a system 410 to illustrate further details regarding possible circuitries for implementing the sub-regions shown in FIG. 3a. FIG. 4 also makes clear how the circuitry may be greatly simplified. This simplifying takes advantage of the rolling shutter nature of the image capture units 107—when the image capture units 107 produce image pixels for different parts of the image on slightly different moments of time.

In the system 410, some of the image capture units 107 are laid onto one or more circuit boards into an array. In sake of brevity, the image capture units 107 are now referred to as cameras 107. In the array, one or more cameras 107 are connected as one common camera unit 420.

The common camera unit 420 comprises a field-programmable gate array (FPGA) 422 that is communicatively connected with each of the cameras 107. The FPGA 422 is configured to synchronise the cameras 107 so that the image formed by adjacent cameras 107 is formed continuously taking into account the rolling shutter. That is, one camera 107 first exposes a first image and the FPGA 422 scans out that first image. Another camera 107 exposes a second image so that the FPGA 422 scans out the second image continuously after the first image, i.e. so that there is no significant delay after scanning out the first image and before scanning out the second image. If the common camera unit 420 comprises a matrix of cameras 107, then the FPGA 422 controls the cameras 107 of the common camera unit 420 to be scanned out one by one in the direction of the rolling shutter operation (in FIG. 4, either horizontally or vertically). The cameras 107 are thus scanned out row by row, column by column, or in some other order. The timing of the scan-out operations may be such that the FPGA 422 receives image data from different cameras 107 as a substantially continuous data stream.

The system 410 further comprises one or more common camera unit data buses 430 through which the FPGA 422 passes the data stream for subsequent processing. The common camera unit data buses 430 are data channels that are configured capable of transporting image data from all of the FPGAs 422 connected thereto.

An interfacing unit 440 is connected to each of the common camera unit data buses and configured to pass all the image data and necessary metadata. The metadata comprises e.g. an identification of the camera 107 from which the image data in question comes from. The metadata is typically provided by the FPGA 422.

The interfacing unit 440 may comprise a coordinating processor 442 (such as an FPGA circuitry, central processing unit, digital signal processor or the like), a data input port 444 and possibly a control output port 446 for controlling the FPGAs 422.

The interfacing unit further comprises a data output port 448 which may comprise a relative small buffer memory 4482 e.g. to allow retransmissions should data be corrupted over a connection 450 between the system 410 and an auxiliary device that receives the image data (such as a computer, not shown).

When data is scanned out from a camera 107, the associated FPGA 422 receives and forwards that data, potentially together with identification of the camera 107, and the interfacing unit 440 further passes on the image data it receives from the different FPGAs 422. All of this may take place without need to buffer and re-buffer the scanned-out image data.

The common camera units may altogether lack memory buffers, whereas in normal implementation, each of the FPGAs 422 would be associated with a memory buffer that is large enough to store at least one entire image frame. Thus, the system 410 can be simplified with the advantages that the manufacturing and maintenance become cheaper and faster and debugging of possible problems is also improved in comparison to an alternative implementation in which the memory buffers are provided. Such an alternative implementation may be more advantageous e.g. when fast data buses are not desired for any reason It is appreciated that by logically dividing the touching surface 101 into a plurality of sub-regions and by processing temporally separately the different sub-regions, harmful reflections e.g. from user's clothing may be greatly reduced. In particular, diagonal reflections from the user may be reduced so that the shadows or light marks reflected by the pointing objects have better contrast to surrounding areas that are deemed not to be contacted.

It should be appreciated that in this document, words comprise, include and contain are each used as open-ended expressions with no intended exclusivity. Moreover, term light here is interchangeable with radiation. While infrared light has in occasions been used, this terming is merely for convenience of explanation the term light is not intended to imply suitability for perception by means of a human eye.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An interactive display device comprising:
an image layer configured to provide a user with a perceivable visual content;
a touching surface covering the image layer or formed by the image layer, the touching surface comprising a plurality of sub-regions that comprise at least a first sub-region and a second sub-region;
a plurality of invisible light sources that comprise a first light source configured to illuminate the first sub-region of the touching surface and a second invisible light source configured to illuminate the second sub-region of the touching surface;
a plurality of touch detection units that comprise first touch detection unit configured to capture a first image of the first sub-region and a second touch detection unit configured to capture a second image of the second sub-region;
a first processor configured to detect from the captured images contact areas where a pointing object contacts the touching surface and thus causes correspondingly one or more marks in the captured images;
wherein during capture of the first image, the first invisible light source is configured to illuminate the first sub-region, and the second invisible light source operates at sufficiently reduced illumination level to reduce undesired reflections of invisible light from non-contacting objects in the vicinity of the touching surface; and
wherein during capture of the second image, the second invisible light source is configured to illuminate the second sub-region, and the first invisible light source operates at sufficiently reduced illumination level to reduce undesired reflections of invisible light from non-contacting objects in the vicinity of the touching surface.

2. The interactive display device of claim 1, wherein a common processor operates as both the first and second processors.

3. The interactive display device of claim 2, wherein the touch detection units comprise rolling shutter camera units.

4. The interactive display device of claim 1, wherein the invisible light is infrared light.

5. The interactive display device of claim 4, wherein the touch detection units comprise rolling shutter camera units.

6. The interactive display device of claim 1, wherein the touch detection units are arranged in a grid.

7. The interactive display device of claim 6, wherein the touch detection units comprise rolling shutter camera units.

8. The interactive display device of claim 1, wherein the touch detection units comprise rolling shutter camera units.

9. The interactive display device of claim 8, wherein the rolling shutter camera unit image capture operations are synchronized such that the rolling shutter operation extends from one rolling shutter camera unit to another.

10. The interactive display device of claim 8, wherein the touch detection units are configured to capture the images from behind the image layer.

11. The interactive display device of claim 1, wherein the touch detection units are configured to capture the images from behind the image layer.

12. A method in an interactive display device, comprising:
providing a user with user perceivable visual content on an image layer, wherein a touching surface covers the image layer or formed by the image layer, the touching surface comprising a plurality of sub-regions that comprise at least a first sub-region and a second sub-region;
alternatingly illuminating different sub-regions of the touching surface with a plurality of invisible light sources, wherein the first sub-region being illuminated by a first light source of the plurality of invisible light sources, and the second sub-region being illuminated by a second light source of the plurality of invisible light sources;
capturing an image of the first illuminated sub-region with a first touch detection unit, when the first sub-region is illuminated by the first light source, and when the second light source operates at sufficiently reduced illumination level to reduce undesired reflections of invisible light from non-contacting objects in the vicinity of the touching surface;
capturing an image of the second illuminated sub-region with a second touch detection unit, when the second sub-region is illuminated by the second light source, and when the first light source operates at sufficiently reduced illumination level to reduce undesired reflections of invisible light from non-contacting objects in the vicinity of the touching surface; and,
detecting from the captured images contact areas where a pointing object contacts the touching surface and thus causes correspondingly one or more marks in the captured images.

13. The method of claim 12, further comprising taking rolling shutter images of the sub-regions and advancing capturing of images from one sub-region to another, such that the rolling shutter operation extends from one sub-region and associated touch detection unit to adjacent sub-region and associated touch detection unit.

14. The method of claim 12, wherein the invisible light is infrared light.

15. The method of claim 12, wherein the touch detection units are arranged in a grid.

16. The method of claim 12, wherein the touch detection units comprise rolling shutter camera units.

17. The method of claim 16, further comprising synchronizing the rolling shutter camera unit image capture operations such that the rolling shutter operation extends from one rolling shutter camera unit to another.

18. The method of claim 12, wherein the touch detection units are configured to capture the images from behind the image layer.

19. A computer program product comprising a non-transitory computer readable medium having computer executable program code stored thereon, which when executed by at least one processor causes an apparatus at least to perform:
providing a user with user perceivable visual content on an image layer, wherein there is a touching surface covering the image layer or formed by the image layer, the touching surface comprising a plurality of sub-regions that comprise at least a first sub-region and a second sub-region;
alternatingly illuminating different sub-regions of the touching surface with a plurality of invisible light sources, wherein the first sub-region being illuminated by a first light source of the plurality of invisible light sources, and the second sub-region being illuminated by a second light source of the plurality of invisible light sources;
capturing an image of the first illuminated sub-region with a first touch detection unit, when the first sub-region is illuminated by the first light source, and when the second light source operates at sufficiently reduced illumination level to reduce undesired reflections of invisible light from non-contacting objects in the vicinity of the touching surface;
capturing an image of the second illuminated sub-region with a second touch detection unit, when the second sub-region is illuminated by the second light source, and when the first light source operates at sufficiently reduced illumination level to reduce undesired reflections of invisible light from non-contacting objects in the vicinity of the touching surface; and,
detecting from the captured images contact areas where a pointing object contacts the touching surface and thus causes correspondingly one or more marks in the captured images.

20. The computer program product of claim 19, further comprising computer executable program code stored thereon, which when executed by at least one processor causes an apparatus to further perform:
synchronizing the rolling shutter camera unit image capture operations in such a way that the rolling shutter operation extends from one rolling shutter camera unit to another.

* * * * *